(12) United States Patent
Guo et al.

(10) Patent No.: US 10,190,394 B2
(45) Date of Patent: Jan. 29, 2019

(54) ENERGY HARVESTING FROM A DOWNHOLE JAR

(71) Applicant: Halliburton Energy Services, Inc., Houston, TX (US)

(72) Inventors: Lianhe Guo, Tomball, TX (US); Christian S. Mappus, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 171 days.

(21) Appl. No.: 15/027,652

(22) PCT Filed: Nov. 8, 2013

(86) PCT No.: PCT/US2013/069251
§ 371 (c)(1),
(2) Date: Apr. 6, 2016

(87) PCT Pub. No.: WO2015/069281
PCT Pub. Date: May 14, 2015

(65) Prior Publication Data
US 2016/0258254 A1 Sep. 8, 2016

(51) Int. Cl.
E21B 31/107 (2006.01)
E21B 6/00 (2006.01)
E21B 41/00 (2006.01)
E21B 31/113 (2006.01)
E21B 47/06 (2012.01)
H02K 7/18 (2006.01)
H02K 35/02 (2006.01)
E21B 47/18 (2012.01)

(52) U.S. Cl.
CPC ........ *E21B 41/0085* (2013.01); *E21B 31/113* (2013.01); *E21B 47/06* (2013.01); *E21B 47/065* (2013.01); *H02K 7/1876* (2013.01); *H02K 35/02* (2013.01); *E21B 47/18* (2013.01)

(58) Field of Classification Search
CPC .. E21B 41/0085; E21B 31/107; E21B 31/113; E21B 31/1135; E21B 6/00
USPC ....................................................... 175/293
See application file for complete search history.

(56) References Cited

U.S. PATENT DOCUMENTS 4,007,798 A 2/1977 Gazda
4,398,898 A 8/1983 Odom
(Continued)

OTHER PUBLICATIONS

International Search Report and Written Opinion of PCT Application No. PCT/US2013/069251 dated Aug. 4, 2014: pp. 1-15.

*Primary Examiner* — Kenneth L Thompson
(74) *Attorney, Agent, or Firm* — Chamberlain Hdrlicka

(57) ABSTRACT

A system for harvesting energy from the operation of a downhole jar is disclosed. The system converts the kinetic energy associated with the operation of the jar to electrical energy by associating the relative movement between a magnet and a coil to the relative movement between a movable member and a stationary member in the jar. Electrical energy is generated in the coil as a result of the relative motion between the magnets and the coil. This electrical energy may be stored in an electrical energy storage subsystem and provided to a downhole tool for use in the wellbore. The downhole tool may be used to power other tools, to take measurements, to communicate with other devices, to actuate other devices, and to otherwise control such other devices.

13 Claims, 5 Drawing Sheets

(56) References Cited

U.S. PATENT DOCUMENTS

| | | | |
|---|---|---|---|
| 4,463,815 A | 8/1984 | Jürgens et al. | |
| 5,624,001 A | 4/1997 | Evans | |
| 6,367,565 B1 * | 4/2002 | Hall | E21B 4/14 |
| | | | 175/296 |
| 6,453,997 B1 | 9/2002 | McNeilly et al. | |
| 6,504,258 B2 | 1/2003 | Schultz et al. | |
| 7,431,474 B2 | 10/2008 | Mah | |
| 7,533,724 B2 | 5/2009 | McLaughlin | |
| 7,753,116 B2 | 7/2010 | Budney et al. | |
| 8,022,561 B2 | 9/2011 | Ciglenec et al. | |
| 8,127,833 B2 | 3/2012 | Pabon et al. | |
| 8,344,526 B2 | 1/2013 | Bhat et al. | |
| 8,350,394 B2 | 1/2013 | Cottone et al. | |
| 8,789,598 B1 * | 7/2014 | Mlcak | E21B 31/107 |
| | | | 166/178 |
| 9,356,497 B2 * | 5/2016 | Chambers | E21B 41/0085 |
| 9,453,410 B2 * | 9/2016 | Logan | E21B 4/14 |
| 2006/0054322 A1 * | 3/2006 | Rose | E21B 31/1135 |
| | | | 166/301 |
| 2006/0157281 A1 | 7/2006 | Downton | |
| 2009/0166045 A1 | 7/2009 | Wetzel et al. | |
| 2009/0260822 A1 | 10/2009 | Stoesz et al. | |
| 2010/0294479 A1 | 11/2010 | Shee | |
| 2011/0120725 A1 * | 5/2011 | Downton | E21B 4/06 |
| | | | 166/373 |
| 2012/0106297 A1 | 5/2012 | Fraser | |
| 2013/0026766 A1 | 1/2013 | Ocalan et al. | |
| 2014/0054090 A1 * | 2/2014 | Schicker | E21B 4/10 |
| | | | 175/95 |
| 2016/0168958 A1 * | 6/2016 | Merlau | H02K 35/02 |
| | | | 166/244.1 |

\* cited by examiner

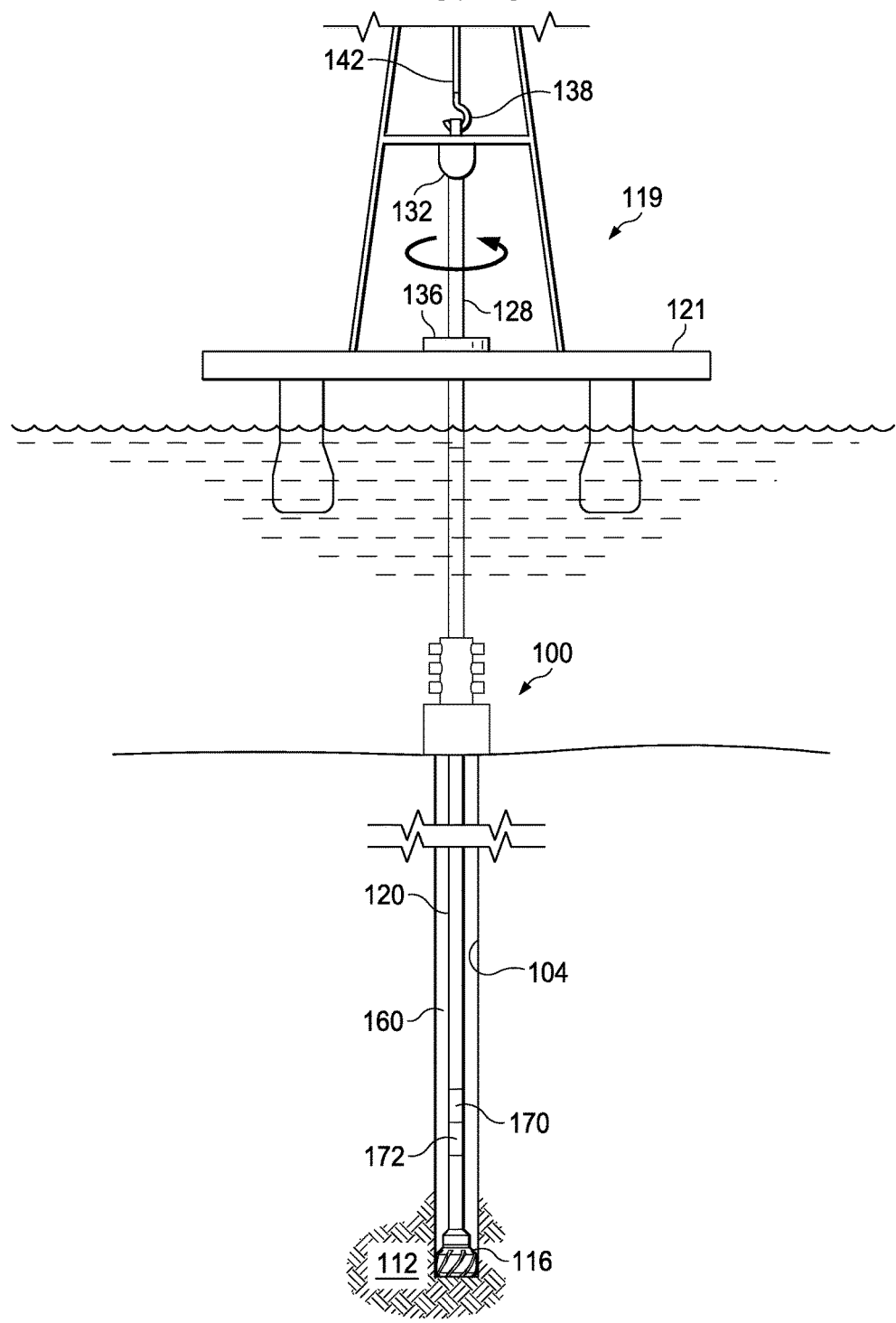

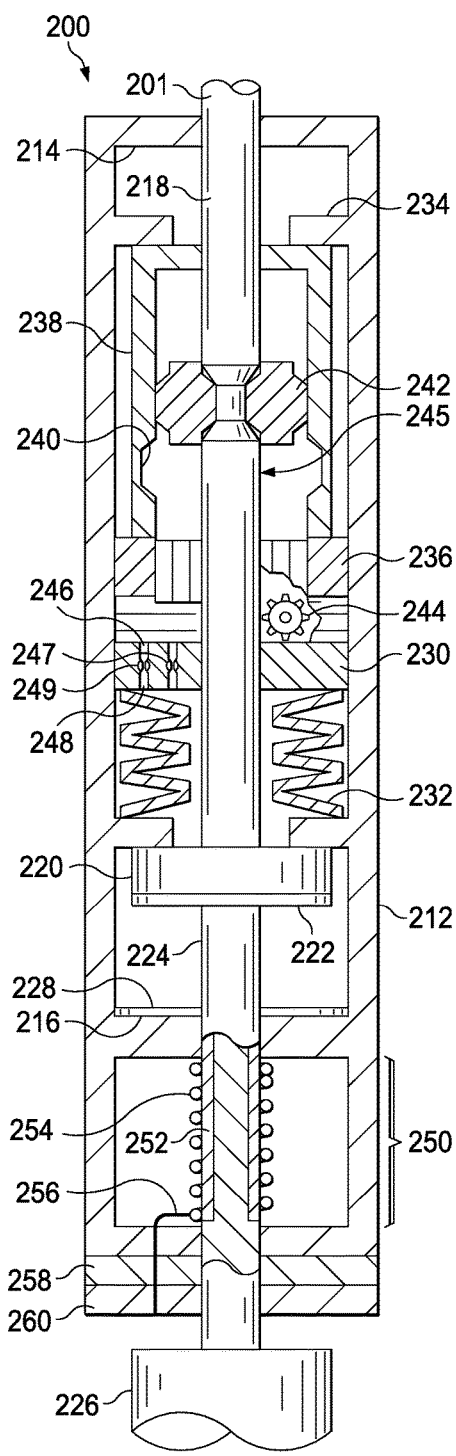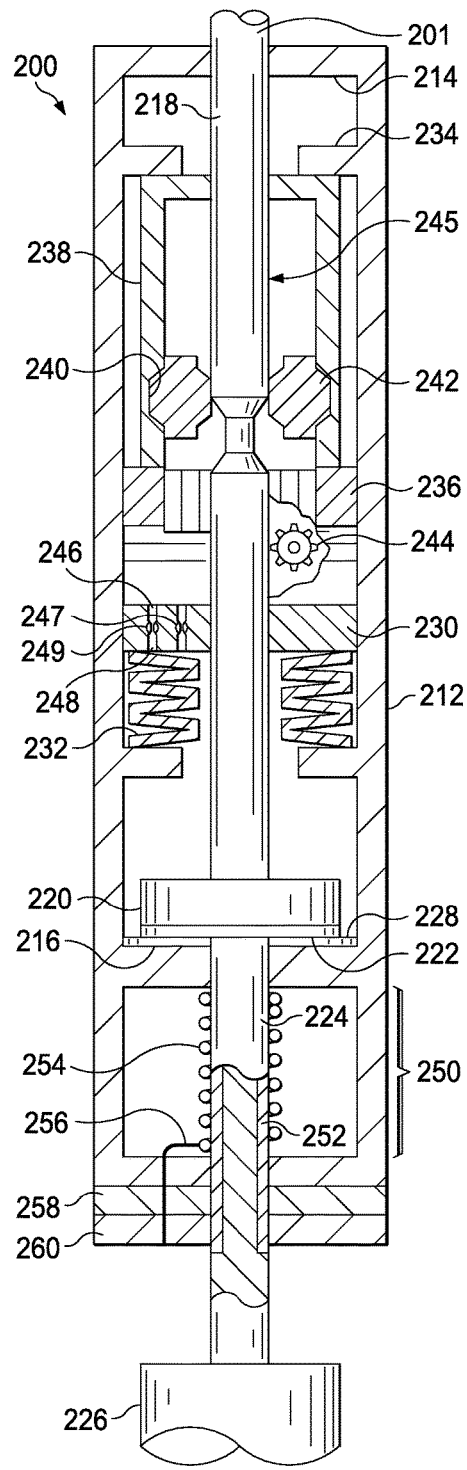
FIG. 2                    FIG. 3

US 10,190,394 B2

ENERGY HARVESTING FROM A DOWNHOLE JAR

FIELD OF THE INVENTION

The present disclosure relates generally to the generation of energy in situ in a downhole environment and more specifically to methods and systems for harvesting energy generated by a downhole jar and storing the harvested energy as electrical energy for subsequent use by other devices.

DESCRIPTION OF RELATED ART

Wells are drilled at various depths to access and produce oil, gas, minerals, and other naturally-occurring deposits from subterranean geological formations. The drilling of a well is typically accomplished with a drill bit that is rotated within the well to advance the well by removing topsoil, sand, clay, limestone, calcites, dolomites, or other materials to form a wellbore. The drill bit is typically attached to a drill string that may be rotated to drive the drill bit and within which drilling fluid, referred to as "drilling mud" or "mud", may be delivered downhole. The drilling mud is used to cool and lubricate the drill bit and downhole equipment and is also used to transport any rock fragments or other cuttings to the surface of the well.

After the wellbore is formed, tools may be deployed by, for example, wireline, slickline, or other conveyances. Wireline-delivered tools are suspended from a wireline that is electrically connected to control systems at the surface of the well, usually for the purposes gathering and conveying data about the formation, wellbore, or fluid in the wellbore. Slickline tools are similarly deployed into a wellbore but may not have an electrical connection to surface equipment. The tools may be deployed by first removing the drill string and then lowering the wireline and tools to an area of interest within the formation. The tools associated with wireline and slickline deployment may be used to measure pressure, temperature, and other properties of formation and wellbore fluids, and may require electric power to operate.

BRIEF DESCRIPTION OF THE DRAWINGS

FIG. 1C illustrates a schematic view of a subsea well in which the energy harvesting system of FIG. 1A is deployed;

FIG. 2 is a sectional view of an embodiment of the energy harvesting system of FIG. 1A in which the energy harvesting system includes a hydraulic jar and an energy harvesting subassembly formed integrally with the jar;

FIG. 3 is a sectional view of the jar of FIG. 2 in an actuated position;

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In addition to the types of downhole tools mentioned above, other downhole operations may also necessitate the use of downhole electrically powered systems and devices. Yet in some situations, it may be difficult, costly, or impractical to supply a dedicated power line or battery to such systems and devices. As a result, downhole tools may include mechanisms for generating power downhole. Such power generation mechanisms may include turbines that harvest kinetic energy from the fluid circulating through the wellbore, circuits that derive energy from steady-state tool vibrations, or similar systems derived from energy sources that operate at a steady state.

In systems that do not include a constant source of kinetic energy, however, intermittent or sporadic sources of energy may be harvested to operate devices having low or moderate power requirements. For example, hydraulic and mechanical jars generate substantial kinetic energy when they are activated to loosen or dislodge downhole devices in the wellbore. Systems and methods are described herein that provide for harvesting kinetic energy from a mechanical or hydraulic jar to generate and store electrical energy for use in other downhole applications.

Such energy-harvesting systems may be used with any of the various techniques employed for forming, operating, maintaining, and evaluating a well. The illustrative systems described herein may be delivered downhole as part of a wireline-delivered downhole assembly or as a part of a drill string. It should also be apparent that given the benefit of this disclosure, the apparatuses and methods described herein have applications in downhole operations other than drilling, and may also be used after a well is completed.

As used herein, the phrases "electrically coupled" and "electrically connected," refer to a form of coupling, connection, or communication related to circuits and electronic devices, and the corresponding transmission of electricity, or electrical energy between such circuits and devices.

Figure 1A:
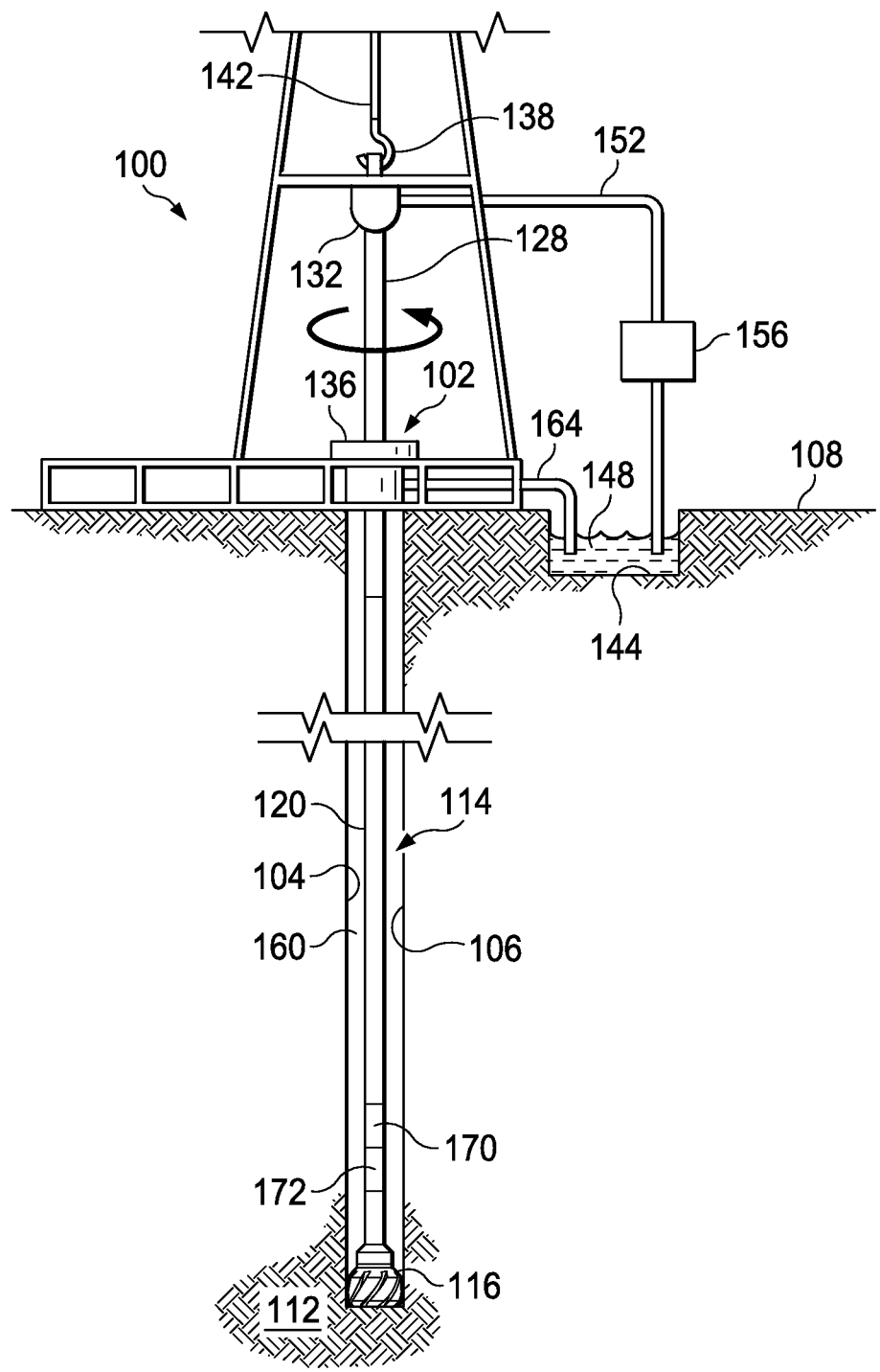
FIG. 1A illustrates a schematic view of a well in which an illustrative embodiment of an energy harvesting system is deployed.
Figure 1B:
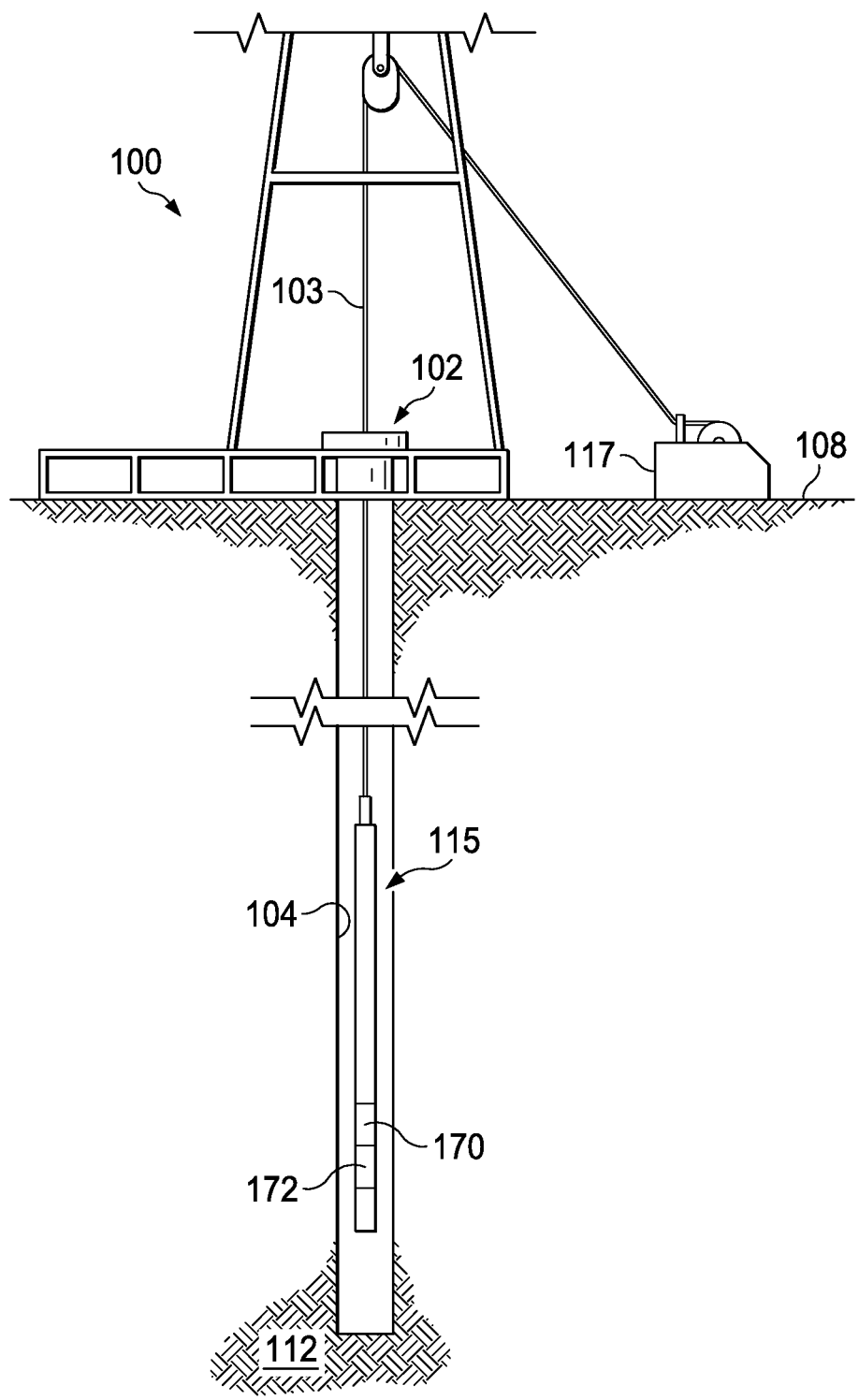
FIG. 1B illustrates a schematic view of a well in which the energy harvesting system of FIG. 1A is deployed in a wireline assembly.

Referring now to FIGS. 1A-1C, a downhole system 100 according to an illustrative embodiment is used in a well 102 having a wellbore 104 that extends from a surface 108 of the well to or through a subterranean geological formation 112. The well 102 is illustrated onshore in FIG. 1A with the system 100 being deployed in land-based well. Alternatively, the system 100 may instead be deployed as part of a wireline assembly 115 (see FIG. 1B), either onshore or off-shore. The wireline assembly 115 includes a winch 117 to lift and lower a downhole portion of the wireline assembly 115 into the well. In still another embodiment, the system 100 may be deployed in a sub-sea well 119 accessed by a fixed or floating platform 121. FIGS. 1A-1C each illustrate these possible uses of the system 100, and while the following description of the system 100 and associated energy harvesting subsystems focuses primarily on the use of the system 100 in the drill string 120 of FIG. 1A, the system 100 may be used instead in the well configurations illustrated in FIGS. 1B and 1C, as well as in other well configurations where it is desired to harvest energy downhole. Similar components in FIGS. 1A-1C are identified with similar reference numerals.

In the embodiment illustrated in FIG. 1A, the well 102 is formed by a drilling process in which a drill bit 116 is turned by a drill string 120 that extends the drill bit 116 from the surface 108 to the bottom of the well 102. The drill string 120 may be made up of one or more connected tubes or pipes, of varying or similar cross-section. The drill string may refer to the collection of pipes or tubes as a single component, or alternatively to the individual pipes or tubes that comprise the string. The term drill string is not meant to be limiting in nature and may refer to any component or components that are capable of transferring rotational energy from the surface of the well to the drill bit. In several embodiments, the drill string 120 may include a central passage disposed longitudinally in the drill string and capable of allowing fluid communication between the surface of the well and downhole locations.

At or near the surface 108 of the well, the drill string 120 may include or be coupled to a kelly 128. The kelly 128 may have a square, hexagonal or octagonal cross-section. The kelly 128 is connected at one end to the remainder of the drill string and at an opposite end to a rotary swivel 132. The kelly passes through a rotary table 136 that is capable of rotating the kelly and thus the remainder of the drill string 120 and drill bit 116. The rotary swivel 132 allows the kelly 128 to rotate without rotational motion being imparted to the rotary swivel 132. A hook 138, cable 142, traveling block (not shown), and hoist (not shown) are provided to lift or lower the drill bit 116, drill string 120, kelly 128 and rotary swivel 132. The kelly 128 and swivel 132 may be raised or lowered as needed to add additional sections of tubing to the drill string 120 as the drill bit 116 advances, or to remove sections of tubing from the drill string 120 if removal of the drill string 120 and drill bit 116 from the well 102 is desired.

A reservoir 144 is positioned at the surface 108 and holds drilling mud 148 for delivery to the well 102 during drilling operations. A supply line 152 is fluidly coupled between the reservoir 144 and the inner passage of the drill string 120. A pump 156 drives fluid through the supply line 152 and downhole to lubricate the drill bit 116 during drilling and to carry cuttings from the drilling process back to the surface 108. After traveling downhole, the drilling mud 148 returns to the surface 108 by way of an annulus 160 formed between the drill string 120 and the wellbore 104. At the surface 108, the drilling mud 148 is returned to the reservoir 144 through a return line 164. The drilling mud 148 may be filtered or otherwise processed prior to recirculation through the well 102.

A jar 170 may be positioned downhole adjacent a downhole tool 172 or work piece to prevent the tool 172 or work piece from becoming lodged in the wellbore 106 or to dislodge the tool 172 in the event the tool 172 becomes stuck.

The tool 172 may be any number of downhole tools. For example, the tool 172 may be a measurement device that measures temperature, pressure, acceleration, or forces that are experienced by the tool 172. While the jar 170 and tool 172 are illustrated as a part of the drill string 120 in FIG. 1A, in other embodiments, the jar 170 and tool 172 may be lowered into the well by wireline (see FIG. 1B) either through the central passage of the drill string 120, or if the drill string 120 is not present, directly through the wellbore 104. As described in more detail below, the jar 170 and tool 172 may include a communications subsystem, including a transceiver for communicating using mud pulse telemetry or another suitable method of wired or wireless communication with a surface controller. The transceiver may transmit data gathered by the tool 172 or receive instructions from a well operator via the surface controller to operate the tool 172.

As noted above, the jar 170 is a mechanical or hydraulic device that delivers an impact load to another object within a drill string 120, completion string, or other tool string deployed in the wellbore 104. The jar 170 may be used to free a stuck object or to set the tool 172. The jar includes a movable element that is activated to generate an impact and a stationary member. The stationary member may be a housing or cylinder and the movable element may be a mandrel or piston located within the housing or cylinder that slides along the axis of the housing or cylinder to generate the impact. The jar 170 may be actuated by pulling the movable element in one direction along the stationary member to compress a spring. When the movable element is released, the spring force accelerates the movable element along the stationary member and the desired impact is generated when the movable element reaches the end of its travel. The jar 170 can be reset and actuated multiple times as needed, and may be included in a variety of downhole configurations, as described below.

Figure 4:
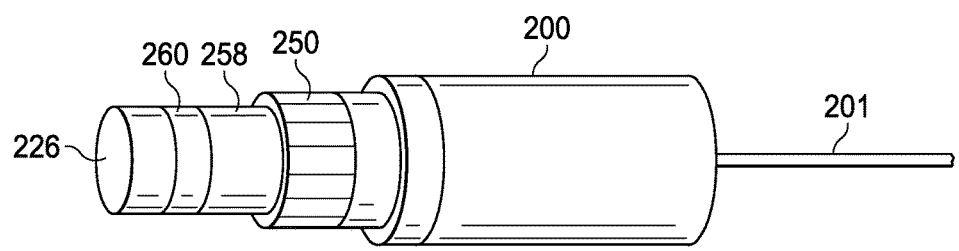
FIG. 4 is a perspective view showing the exterior of the jar of FIG. 3.

FIGS. 2 and 3 show a jar 200, which may be a hydraulic or mechanical jar that is analogous to the jar 170 of FIGS. 1A-1C, in a closed (or "pre-actuated") position and an open (or "actuated") position, respectively. FIG. 4 shows a schematic, external view of the jar 200. The jar 200 may be lowered into the wellbore 106 by a conveyance 201, which may be a drill string, wireline, slickline, or other conveyance. The jar 200 includes a generally cylindrical housing 212 with a first end wall 214 defining the top of the jar 200 and a second end wall 216 defining the bottom of the jar 200. Collectively, the cylindrical housing 212, first end wall 214 and second end wall 216 define a sealed cavity within the housing. The jar 200 includes a movable member, which may be, for example, the housing 212, which moves relative to a stationary member, which may be a mandrel 218. In an alternative embodiment, the mandrel 218 may be axially moveable within the housing 212. In an embodiment in which the mandrel 218 is stationary, the housing 212 is moveable relative to the mandrel 218 when the mandrel 218 is connected to a tool or drill string stuck in the wellbore), with an anvil 220 supported on the mandrel 218 and having a lower anvil surface 222. A mandrel extension 224 extends downward from the anvil 220 to a coupling 226 or adaptor at the lower end of mandrel extension 224. The mandrel extension 224 may be secured to the tool or to an object stuck in the wellbore to apply a jarring force when the jar is activated. A hammer surface 228 is provided on top of a lower plate at the second end wall 216, and strikes the anvil surface 222 during a jarring action, as explained below.

A piston 230 is also secured to the mandrel 218, and is biased in an upward position by a plurality of springs 232. A ring 234 at the upper end of the housing 212 and ring 236 adjacent to the middle portion of the housing 212 form an enclosure about a sleeve 238, which includes an annular groove 240 therein. A collet 242 is coupled to the mandrel 218 as shown. When aligned with the groove 240, the collet 242 is free to move radially into the groove 240. Each of the piston 230 and the anvil 220 is securely coupled to the mandrel 218, such that, in normal operation, the housing 212 moves upward during actuation of the jar relative to the mandrel 18, which may be stationary.

The jar 200 of FIG. 1 also includes an indicator 244, which may include a portion that is viewable through the housing 212. Actuation of the jar 200 and the resulting upward movement of the housing 212 relative to the mandrel 218 may increment a counter included in the indicator 244 to whether the hydraulic jar has been actuated and the number of times the jar 200 has been actuated.

The piston 230 includes a flow path 246 and a flow meter 247 for metering fluid from the lower chamber below the piston 230 to the upper chamber above the piston 230. The piston 230 also includes a second flow path 248 and a check valve 249 for allowing fluid above the piston 230 to quickly pass beneath the piston 230 when resetting the jar 200.

FIG. 3 illustrates the jar 200 shown in the actuated position in which the housing 212 has moved upward relative to the mandrel 218, so that the collets 242 are now positioned within the groove 240, thereby releasing the collets 242 from the mandrel 218, and allowing movement of the anvil 220 relative to the housing 212. The opening of the hydraulic jar 200 thus causes the hammer surface 228 to strike the anvil surface 222, creating a jarring force to, for example free an object stuck in the wellbore.

The jar 200 also includes an energy harvesting subsystem 250, which may be formed integrally to the jar 200, as shown in FIGS. 2 and 3, or formed as a distinct subassembly that is deployed with the jar 200 to harvest energy from the motion of the jar 200. The energy harvesting subsystem 250 includes a conductive coil 254, which may be a coil winding that is coupled to or embedded in the stationary member, which is the mandrel 218, and a magnet 252 that is coupled to or embedded in the movable member, which is the housing 212 in the embodiment of FIGS. 2 and 3. In another embodiment, the magnet 252 is coupled to or embedded in the stationary member and the conductive coil 254 is coupled to or embedded in the movable member. In an embodiment, protective elements such as flanges may be included to isolate or shelter the coil 254 to protect it from damage. In an embodiment in which the magnet 252 is coupled to the housing, 212, such flanges may be included to isolate and protect the magnet 252.

The magnet 252 and conductive coil 254 are positioned such that motion of the magnet 252 relative to the conductive coil 254 induces an electric current in the conductive coil 254. Using the same physical principles applied in most magnet-coil generators, the kinetic energy of the jar 200 is converted into electrical energy in the conductive coil 254. The conductive coil 254 is coupled by an electrical coupling 256 to an energy storage device 258, which may include a battery, a capacitor, or other structure for converting the electrical energy induced in the conductive coil 254 into stored electrical energy in the energy storage device 258. In an embodiment, the energy harvesting subsystem 250 may also include a controller 260 that is coupled to the energy storage device 258 to monitor the amount of energy stored in the energy storage device 258 and transmit power to other downhole devices. In an embodiment, the controller 260 may also include a transceiver or communications system to transmit data relating to the amount of energy stored in the energy storage device 258 to an operator at the surface or to other downhole communications devices.

In another embodiment, the movable member may be coupled to a worm gear component that engages a complementary worm gear component that is coupled to stationary member to translate the linear kinetic energy generated by a jar into rotational energy. For example, the worm gear component may cause the complementary worm gear component to rotate, and the complementary worm gear component may be coupled to a flywheel that includes magnets. In such an embodiment, the conductive coils may be coil windings arranged to receive and transmit an electric current that is induced by the rotational motion of the magnets in a manner similar to a conventional magnet-coil generator.

To power certain types of downhole devices, the jar 200 includes the foregoing features that enable it to harvest kinetic energy generated when the jarring force is applied and store the harvested energy as electrical energy for use. The jar 200 generates substantial kinetic energy, if only for a short time, when the movable member of the jar 200 is activated to move rapidly relative to the stationary member. In the embodiment described above, the jar 200 is a hydraulic jar and the movable member is the cylindrical housing 212 and the stationary member is the mandrel 218. In another embodiment, the movable member is the mandrel 218 and the stationary member is the cylindrical housing 212. In another embodiment, the jar may be a mechanical jar, and the movable member and the stationary member may be two metal parts, with the movable member having a mass that is sized and configured to deliver an impact that dislodges a stuck object in a wellbore.

Activation of the movable member may be initiated by applying an instantaneous tension, or up-pull, to the conveyance 201 from which the jar is suspended. As noted above, the conveyance 201 may be a slickline, wireline, drill pipe, coiled tube, or other suitable conveyance 201. In operation, the tension is applied from the surface through the slickline, wireline, drill pipe or coiled tube to create an excessive tension that activates the jar. Such activation causes the movable member to move rapidly relative to the stationary member until the movable member collides with stationary member to generate an impact, or "jarring action." After each jarring action, the jar 200 may be reset and reactivated to generate additional jarring actions.

In an embodiment, the jar 200 may be designed with an actuation delay that requires the actuation tension to be applied for a sustained time period to activate the jar 200. In addition, the jar 200 may be configured to automatically reset so that continuous jarring can be made repeatedly in very short time intervals, which may provide a more regular source of kinetic energy for harvesting. The more regular source of kinetic energy may be converted to electrical energy that can be stored in greater volumes to provide power to downhole systems such as logging and measurement systems, communications systems, actuators for other downhole devices, and control systems. Such logging and measurement systems may include Logging-While-Drilling (LWD) and Measurement-While-Drilling (MWD) systems.

Figure 5:
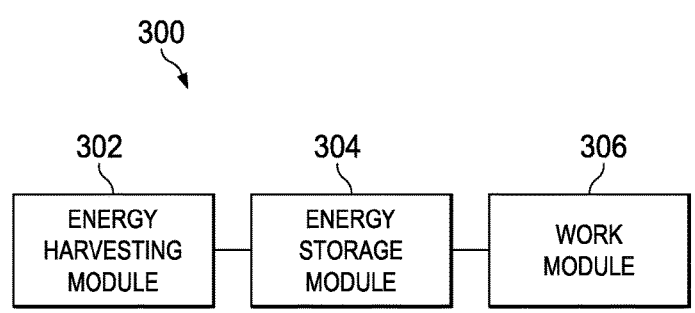
FIG. 5 is a block diagram showing a system that includes an energy harvesting module, an energy storage module, and a work module.

FIG. 5 shows a representative energy harvesting system 300. The system includes an energy harvesting module 302, which may be a jar or jar attachment as described above to harvest kinetic energy from the operation of a jar and convert the harvested energy to electrical energy. The system 300 further includes an energy storage module 304 that is electrically coupled to the energy harvesting module 302 and a work module 306. As described above, the energy storage module 304 may be a battery, capacitor, or other suitable device for storing electrical energy. The energy storage module 304 is operable to provide electric power to the work module 306 via the electrical coupling between the two modules. The work module may be a downhole tool, a sensor, or other device, and may be used for measurement, logging, actuation of other devices, or control of other downhole tools and processes.

The foregoing text describes an apparatus for converting kinetic energy to electrical energy in a downhole environment. The apparatus may include a jar that has a movable member and a stationary member, with the movable member being movable relative to the stationary member by a control system. The control system may be a hydraulic, electrical, or mechanical control system that applies an activation signal, such as cable tension or a pressure pulse, to activate the jar. The jar further includes one or more magnets and one or more conductive coils. The magnet moves relative to the coil to generate electrical energy in response to movement of the movable member relative to the stationary member.

In an embodiment, the apparatus also includes an energy storage device coupled to the one or more conductive coils and operable to harvest and store electrical energy generated in response to movement of the movable member relative to the stationary member. The jar may be activated by a tension force applied from a tensile supporting member, which may be a cable, a string of pipe, or a similar conveyance, to the jar.

The jar may be a hydraulic jar and as such, a hydraulic actuator may be used to activate the jar. In such an embodiment, the hydraulic actuator may provide a time delay before activating the jar. Further, the jar may include a mechanical detent to cause a time delay prior to activation of the jar. In addition to being a hydraulic jar, the jar may instead be a mechanical jar.

In an embodiment, the jar includes a movable member formed from a cylindrical housing having a sidewall and at least one hole formed in the sidewall. At least a portion of the stationary member may be located within the cylindrical housing and the movable member is movable moves in response to the motion of the conveyance. The cylindrical housing may include a magnetic chamber formed by the sidewall, a first end wall, and a second end wall, and wherein the one or more magnets are protected by first end wall and second end wall, and wherein the magnets are offset from the movable member and constrained in part by the first end wall and second end wall.

One or more magnets may be fixed to the stationary member and at least one or more conductive coils may be fixed to the movable member. In an alternative embodiment, one or more conductive coils are fixed to the stationary member and one or more magnets is fixed to the movable member. In each case, the conductive coils may be embedded in the surface of the movable member or located at an end of the movable member.

Where the conductive coils are arranged within a cylindrical housing, for example, the conductive coils may be arranged cylindrically about the magnets, and the magnets may be constrained to move axially within a cylindrical are formed by the conductive coils.

In an embodiment, an illustrative apparatus also includes an energy storage module that is coupled to the coil to receive and store generated electricity. The energy storage module may be a capacitor that is conductively coupled to the conductive coil to receive a charge or a battery and a charging circuit coupled to the conductive coil.

In another embodiment, a system for generating electrical energy in a downhole environment includes a conveyance and a jar having a movable member and a stationary member, the movable member being movable relative to the stationary member by a control system. The system also includes a magnet and a conductive coil, the magnet being movable relative to the coil to generate electrical energy in response to movement of the movable member relative to the stationary member.

The system may include an energy storage subsystem having a battery and a charging circuit coupled to the conductive coil and the battery to charge the battery. In addition, the system may include a downhole tool that receives power from the energy storage subsystem. The downhole tool may include a controller and a memory, and may be a measurement tool or similar tool operable to measure temperature, pressure, acceleration, or force within the wellbore. The downhole tool may also include a counter that is operable to count a number of jar actions and store the count to the memory. Such a memory may be a flash memory, a nonvolatile RAM memory, or other suitable type of memory. In addition to the foregoing, the downhole tool may include a communications subsystem operable to communicate with a surface computer. In turn, the communications subsystem may include a serial communication bus.

The conveyance described above may include a drum and a spool of slickline or wireline, the slickline or wireline being coupled to the jar and the drum. In an embodiment, the stationary member is coupled to a downhole tool via a coupling, and the downhole tool may be an object that is lodged or stuck within a wellbore. The conveyance may alternatively be a string of pipe coupled to the jar or a string of coiled tubing coupled to the jar. The conveyance may be operable to actuate the jar by applying a tension force or by applying a compressive force.

In an illustrative embodiment, a method for generating electrical energy in a wellbore includes (i) operating a jar deployed within the wellbore, the jar having a movable member and a stationary member, the movable member being movable relative to the stationary member, and the jar having a magnet and conductive coil, with the magnet being movable relative to the coil to generate electrical energy in response to movement of the movable member relative to the stationary member; and (ii) storing the electrical energy in an energy storage subsystem, the energy storage subsystem being electrically coupled to the conductive coil.

As noted above, the energy storage subsystem may include a capacitor and a charging circuit coupled to the conductive coil and the capacitor to charge the capacitor. For example, the energy storage subsystem may include a battery and a charging circuit coupled to the conductive coil and the battery to charge the battery.

The method may include providing electrical energy to a downhole tool using the energy storage subsystem, and using the downhole tool to measure temperature, pressure, acceleration, or force experienced by components in the wellbore. Further, the downhole tool may be used to count a number of jar actions and store the count to a memory within the downhole tool.

The illustrative systems, methods, and devices described herein may also be described by the following examples:

EXAMPLE 1

An apparatus for converting kinetic energy to electrical energy in a downhole environment, the apparatus comprising:
 a jar comprising a movable member and a stationary member, the movable member being movable relative to the stationary member by a control system; and
 at least one magnet;
 at least one conductive coil;
 wherein the magnet moves relative to the coil to generate electrical energy in response to movement of the movable member relative to the stationary member.

EXAMPLE 2

The apparatus of example 1, further comprising an energy storage device coupled to the conductive coil and operable to harvest and store electrical energy generated in response to movement of the movable member relative to the stationary member.

EXAMPLE 3

The apparatus of examples 1 or 2, wherein the jar is activated by a tension force applied from a tensile supporting member.

EXAMPLE 4

The apparatus of example 3, wherein the tensile supporting member is a cable.

EXAMPLE 5

The apparatus of example 3, wherein the tensile supporting member is a string of pipe.

EXAMPLE 6

The apparatus of examples 1 or 2 wherein the jar is a hydraulic jar and a hydraulic actuator is used to activate the jar.

EXAMPLE 7

The apparatus of example 6, wherein the hydraulic actuator provides a time delay.

EXAMPLE 8

The apparatus of examples 1 or 2, wherein the jar uses a mechanical detent to provide a time delay to activate the jar.

EXAMPLE 9

The apparatus of examples 1 or 2, wherein the jar is a mechanical jar.

EXAMPLE 10

The apparatus of examples 1 or 2, wherein:
the movable member comprises a cylindrical housing having a sidewall and at least one hole formed in the sidewall;
at least a portion of the stationary member is located within the cylindrical housing; and
the movable member moves in response to the motion of a conveyance member.

EXAMPLE 11

The apparatus of example 10, wherein the cylindrical housing comprises a magnetic chamber formed by the sidewall, a first end wall, and a second end wall, and wherein the magnets are protected by first end wall and second end wall, and wherein the magnets are offset from the movable member and constrained in part by the first end wall and second end wall.

EXAMPLE 12

The apparatus of examples 1 or 2, wherein at least one magnet is fixed to the stationary member and at least one conductive coil is fixed to the movable member.

EXAMPLE 13

The apparatus of examples 1 or 2, wherein at least one conductive coil is fixed to the stationary member and at least one magnet is fixed to the movable member.

EXAMPLE 14

The apparatus of examples 1 or 2, wherein at least one conductive coil is embedded in a surface of the movable member.

EXAMPLE 15

The device of example 1 or 2 wherein the conductive coil is located at an end of the movable member.

EXAMPLE 16

The apparatus of examples 1 or 2, wherein at least one of the conductive coils is arranged cylindrically about the magnets, and wherein the magnets are constrained to move axially within a cylindrical member formed by the conductive coils.

EXAMPLE 17

The apparatus of examples 1 or 2, further comprising an energy storage module, the energy storage module being coupled to the coil to receive and store generated electricity.

EXAMPLE 18

The apparatus of example 17, wherein the energy storage module comprises a capacitor that is conductively coupled to the conductive coil to receive a charge.

EXAMPLE 19

The apparatus of example 17, wherein the energy storage module comprises a battery and a charging circuit coupled to the conductive coil.

EXAMPLE 20

A system for generating electrical energy in a downhole environment, the system comprising:
a conveyance;
a jar comprising a movable member and a stationary member, the movable member being movable relative to the stationary member by a control system; and
a magnet; and
a conductive coil;
wherein the magnet moves relative to the coil to generate electrical energy in response to movement of the movable member relative to the stationary member.

EXAMPLE 21

The system of example 20, further comprising an energy storage subsystem electrically coupled to the conductive coil.

EXAMPLE 22

The system of example 21, wherein the energy storage subsystem comprises a capacitor and a charging circuit coupled to the conductive coil and the capacitor to charge the capacitor.

EXAMPLE 23

The system of example 21, wherein the energy storage subsystem comprises a battery and a charging circuit coupled to the conductive coil and the battery to charge the battery.

EXAMPLE 24

The system of example 20, further comprising a downhole tool powered by the energy storage subsystem.

EXAMPLE 25

The system of example 24, wherein the downhole tool further comprises a controller and a memory.

EXAMPLE 26

The system of example 25, wherein the downhole tool comprises a measurement tool.

EXAMPLE 27

The system of example 26, wherein the measurement tool is operable to measure temperature, pressure, acceleration, or force.

EXAMPLE 28

The system of example 26, wherein the measurement tool comprises a counter that is operable to count a number of jar actions and store the count to the memory.

EXAMPLE 29

The system of example 29, wherein the controller is electrically coupled to the downhole tool and the memory.

EXAMPLE 30

The system of example 25, wherein the memory comprises a flash memory.

EXAMPLE 31

The system of example 25, wherein the memory comprises a nonvolatile RAM memory.

EXAMPLE 32

The system of example 25, wherein the downhole tool comprises a communications subsystem operable to communicate with a surface computer.

EXAMPLE 33

The system of example 32, wherein the communications subsystem comprises a serial communication bus.

EXAMPLE 34

The system of example 20, wherein the conveyance comprises module a drum and a spool of slickline, the slickline being coupled to the jar and the drum.

EXAMPLE 35

The system of example 20, wherein the conveyance comprises module a drum and a spool of wireline, the wireline being coupled to the jar and the drum.

EXAMPLE 36

The system of example 20, wherein the stationary member is coupled to a downhole tool via a coupling.

EXAMPLE 37

The system of example 20, wherein the downhole tool is located downhole and is lodged in the wellbore.

EXAMPLE 38

The system of example 20, wherein the conveyance comprises a string of pipe coupled to the jar.

EXAMPLE 39

The system of example 20, wherein the conveyance comprises a string of coiled tubing coupled to the jar.

EXAMPLE 40

The system of example 20, wherein the conveyance is operable to actuate the jar by applying a tension force.

EXAMPLE 41

The system of example 20, wherein the conveyance is operable to actuate the jar by applying a compressive force.

EXAMPLE 42

The system of example 20, wherein at least one the magnets is attached to the stationary member and at least one of the conductive coils is attached to the movable member.

EXAMPLE 43

The system of example 20, wherein at least one the magnets is attached to the movable member and at least one of the conductive coils is attached to the stationary member.

EXAMPLE 44

The system of example 20, where the conductive coil is embedded in the movable member.

EXAMPLE 45

The system of example 20, where the conductive coil is affixed to an end of the movable member.

EXAMPLE 46

The system of example 20, wherein the stationary member comprises the conductive coil and the conductive coil is attached to a cylindrical housing, wherein the movable member comprises a mandrel that is movable in an axial direction relative to the cylindrical housing, and wherein the mandrel comprises the magnet.

EXAMPLE 47

A method for generating electrical energy in a wellbore, the method comprising:
operating a jar deployed within the wellbore, the jar comprising a movable member and a stationary member, the movable member being movable relative to the stationary member, and further comprising a magnet and a conductive coil, the magnet being movable relative to the coil to generate electrical energy in response to movement of the movable member relative to the stationary member; and
storing the electrical energy in an energy storage subsystem, the energy storage subsystem being electrically coupled to the conductive coil.

EXAMPLE 48

The method of example 47, wherein the energy storage subsystem comprises a capacitor and a charging circuit coupled to the conductive coil and the capacitor to charge the capacitor.

EXAMPLE 49

The method of example 47, wherein the energy storage subsystem comprises a battery and a charging circuit coupled to the conductive coil and the battery to charge the battery.

EXAMPLE 50

The method of example 47, further comprising providing electrical energy to a downhole tool using the energy storage subsystem.

EXAMPLE 51

The method of example 50, further comprising using the downhole tool to measure temperature, pressure, acceleration, or force.

EXAMPLE 52

The method of example 50, further comprising using the downhole tool to count a number of jar actions and store the count to a memory within the downhole tool.

It should be apparent from the foregoing that an invention having significant advantages has been provided. While the invention is shown in only a few of its forms, it is not limited to only these embodiments but is susceptible to various changes and modifications without departing from the spirit thereof.

We claim:
1. An apparatus for converting kinetic energy to electrical energy in a downhole environment, the apparatus comprising:
a jar comprising a movable member and a stationary member, the movable member being movable relative to the stationary member by a control system;
a magnet coupled to the stationary member;
a conductive coil coupled to the movable member; wherein the magnet moves relative to the coil to generate electrical energy in response to movement of the movable member relative to the stationary member upon actuation of the jar; and
an energy storage device coupled to the movable member and electrically coupled to the conductive coil, the energy storage device operable to harvest and store electrical energy generated in response to movement of the movable member relative to the stationary member.

2. The apparatus of claim 1, wherein the conductive coil is embedded in a surface of the movable member.

3. A system for generating electrical energy in a downhole environment, the system comprising:
a conveyance;
a jar comprising a movable member and a stationary member, the movable member being movable relative to the stationary member by a control system;
a magnet coupled to the stationary member; and
a conductive coil coupled to the movable member; wherein the magnet moves relative to the coil to generate electrical energy in response to movement of the movable member relative to the stationary member; and
an energy storage subsystem coupled to the movable member and electrically coupled to the conductive coil.

4. The system of claim 3, further comprising a downhole tool powered by the energy storage subsystem.

5. The system of claim 4, wherein the downhole tool further comprises a controller and a memory.

6. The system of claim 5, wherein the downhole tool comprises a counter that is operable to count a number of jar actions and store the count to the memory.

7. The system of claim 3, wherein the conveyance comprises a module, a drum and a spool of wireline, the wireline being coupled to the jar and the drum.

8. A method for generating electrical energy in a wellbore, the method comprising:
operating a jar deployed within the wellbore, the jar comprising a movable member and a stationary member, the movable member being movable relative to the stationary member, and further comprising a magnet coupled to a stationary member and a conductive coil coupled to the movable member, the magnet being movable relative to the coil to generate electrical energy in response to movement of the movable member relative to the stationary member; and
storing the electrical energy in an energy storage subsystem coupled to the movable member, the energy storage subsystem being electrically coupled to the conductive coil.

9. The method of claim 8, wherein the energy storage subsystem comprises a capacitor and a charging circuit coupled to the conductive coil and the capacitor to charge the capacitor.

10. The method of claim 8, wherein the energy storage subsystem comprises a battery and a charging circuit coupled to the conductive coil and the battery to charge the battery.

11. The method of claim 8, further comprising providing electrical energy to a downhole tool using the energy storage subsystem.

12. The method of claim 11, further comprising using the downhole tool to measure at least one of the group consisting of temperature, pressure, acceleration, and force.

13. The method of claim 11, further comprising using the downhole tool to count a number of jar actions and store the count to a memory within the downhole tool.

\* \* \* \* \*